(12) United States Patent  (10) Patent No.: US 9,154,182 B2
Thachile  (45) Date of Patent: Oct. 6, 2015

(54) GENERATING PSEUDO-RANDOM FREQUENCY SIGNALS

(71) Applicant: FUJITSU LIMITED, Kawasaki-shi, Kanagawa (JP)

(72) Inventor: Pradip Thachile, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/172,760

(22) Filed: Feb. 4, 2014

(65) Prior Publication Data
US 2015/0222324 A1  Aug. 6, 2015

(51) Int. Cl.
*G06F 7/58* (2006.01)
*H04B 1/7136* (2011.01)

(52) U.S. Cl.
CPC .................................... *H04B 1/7136* (2013.01)

(58) Field of Classification Search
CPC ............ G06F 7/58; G06F 7/582; G06F 7/586
USPC ........... 375/140, 146; 708/250, 251, 252, 254
See application file for complete search history.

(56) References Cited

U.S. PATENT DOCUMENTS

| 6,144,172 | A   | * | 11/2000 | Sun .............................. 315/291 |
| 2006/0279366 | A1 | * | 12/2006 | Kussener et al. ............... 331/78 |
| 2007/0210776 | A1 | * | 9/2007 | Oka ............................. 323/283 |
| 2012/0242379 | A1 | * | 9/2012 | Obkircher et al. ............ 327/117 |

\* cited by examiner

*Primary Examiner* — Kevin Kim
(74) *Attorney, Agent, or Firm* — Maschoff Brennan

(57) ABSTRACT

A system configured to generate a signal with a random or pseudo-random frequency may include an oscillator and a signal generator. The oscillator may be configured to generate an oscillator signal. A frequency and a phase of the oscillator signal may be random or pseudo-random and may be based on a value of a received control signal. The signal generator may be configured to generate the control signal based on the oscillator signal and a seed state. The value of the control signal may be random or pseudo-random.

17 Claims, 7 Drawing Sheets

GENERATING PSEUDO-RANDOM FREQUENCY SIGNALS

FIELD

The embodiments discussed herein are related to generating pseudo-random frequency signals.

BACKGROUND

In various technologies, spread-spectrum techniques are implemented. For example, spread-spectrum techniques may be implemented in telecommunication and radio communication systems. Spread-spectrum techniques may include methods by which a signal, such as an electrical, electromagnetic, and/or acoustic signal, among others, is generated with a bandwidth that is deliberately spread in the frequency domain. A typical method to spread a signal in the frequency domain is to combine the signal with a random or pseudo-random signal.

Spread-spectrum techniques may be implemented for various reasons. For example, spread-spectrum techniques may be used to encrypt a communication transmitted between two entities, such as between a base station and user equipment in a wireless network. Spread-spectrum techniques may also be used to increase the resistance of a signal to natural interference, noise, and/or jamming. Alternately or additionally, spread-spectrum techniques may be used to limit a power flux density of a signal, for example, in satellite downlinks.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a system may be configured to generate a signal with a random or pseudo-random frequency. The system may include an oscillator and a signal generator. The oscillator may be configured to generate an oscillator signal. A frequency and a phase of the oscillator signal may be random or pseudo-random and may be based on a value of a received control signal. The signal generator may be configured to generate the control signal based on the oscillator signal and a seed state. The value of the control signal may be random or pseudo-random.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

According to an aspect of an embodiment, a random frequency signal generating system is described herein that is configured to generate a random frequency signal that has a random frequency and phase. The random frequency signal generating system may include an oscillator and a pseudo-random signal generator. The signal generator may be configured to generate a random or pseudo-random control signal. The oscillator may generate an oscillation signal based on the control signal. In particular, a frequency of the oscillation signal may be determined based on a value of the control signal. Additionally, the oscillation signal may be feedback to the signal generator. Based on the oscillation signal, the signal generator may change the value of the control signal such that the control signal is synchronized with the oscillation signal. The resulting oscillation signal may be output by the random frequency signal generating system as the random frequency signal. The random frequency signal generating system may be used in systems that implement spread spectrum techniques, such as communication systems, for multiplexing and encrypting signals. Alternately or additionally, the random frequency signal generated by the random frequency signal generating system may be employed by systems that use a signal with random frequency and phase.

Embodiments of the present invention will be explained with reference to the accompanying drawings.

Figure 1:
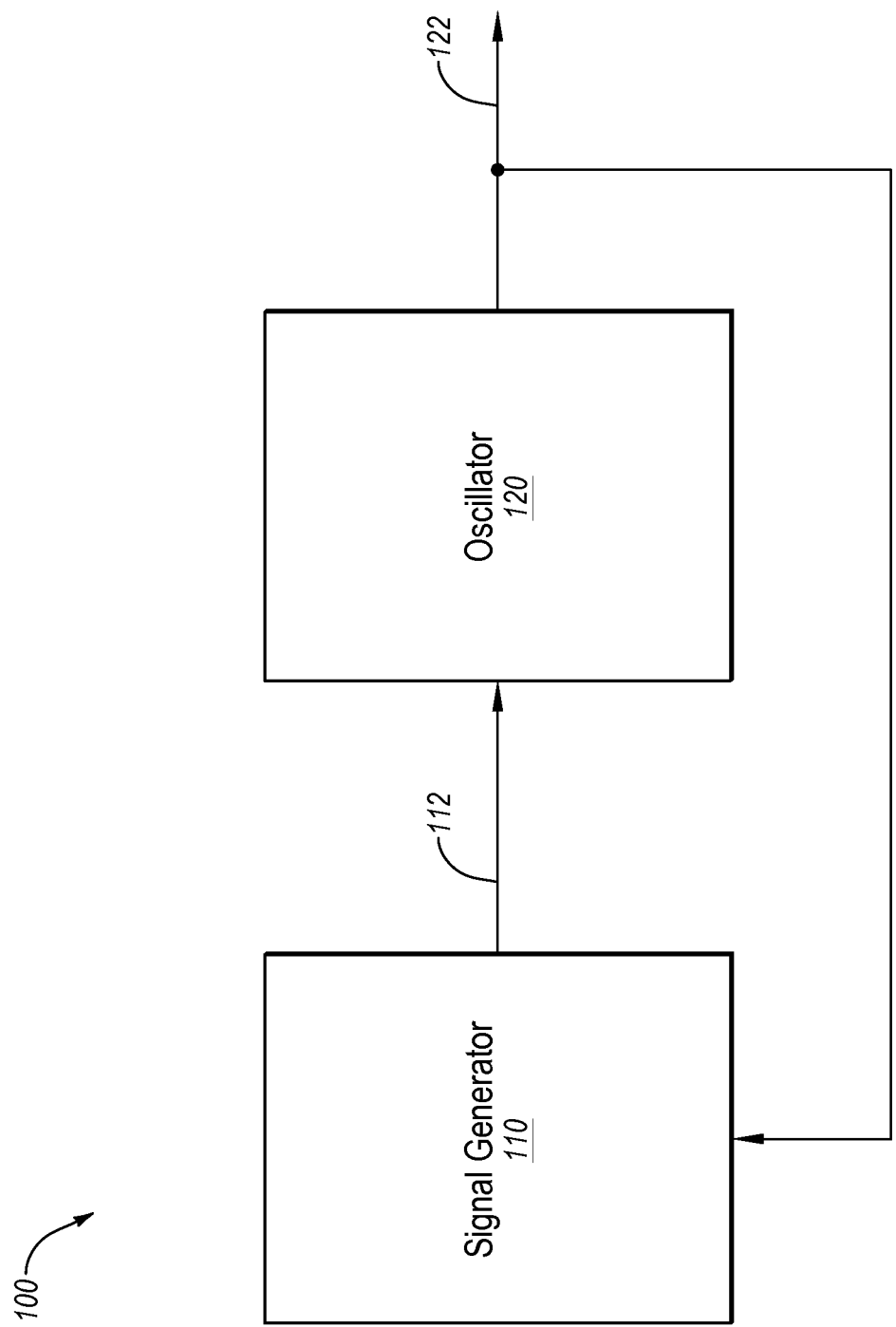
FIG. 1 is a block diagram of an example random frequency signal generating system.

FIG. 1 is a block diagram of an example random frequency signal generating system 100 ("the system 100"), arranged in accordance with at least one embodiment described herein. The system 100 may include a random or pseudo-random signal generator 110 ("signal generator 110") and an oscillator 120 that are communicatively coupled.

The signal generator 110 may be configured to generate a random or pseudo-random control signal 112. The signal generator 110 may send the control signal 112 to the oscillator 120.

The oscillator 120 may be configured to generate an oscillation signal 122 based on the control signal 112. In particular, a frequency and a phase of the oscillation signal 122 may be based on a value of the control signal 112. For example, the oscillator 120 may be configured to generate the oscillation signal 122 with a frequency within a frequency band. The value of the control signal 112 may determine the frequency of the oscillation signal 122 within the frequency band of the oscillator 120. With the control signal 112 being random or pseudo-random, the oscillation signal 122 may have a random or pseudo-random frequency.

The oscillation signal 122 may also be feedback to the signal generator 110. The signal generator 110 may receive the oscillation signal 122 and may change the value of the control signal 112 based on a rising and/or falling edge of the oscillation signal 122. Changing the value of the control signal 112 may result in the frequency of the oscillation signal 122 changing. Due to the frequency of the oscillation signal 122 changing based on the change in the control signal 112, the intervals between changes in the control signal 112 may be random.

An example of the operation of the system 100 follows. The signal generator 110 may generate the control signal 112 with a first random value or a first pseudo-random or random value. For simplicity in the discussion that follows, an example will be described using random values, with the understanding that pseudo-random values may instead be used. Based on the first random value, the oscillator 120 may change the frequency of the oscillation signal 122 to a first frequency. At the next rising edge and/or falling edge of the oscillation signal 122, the signal generator 110 may change the value of the control signal 112 to a second random value. Based on the second random value, the oscillator 120 may change the frequency of the oscillation signal 122 to a second frequency. With the oscillation signal 122 at the second frequency, the rising and/or falling edge of the oscillation signal 122 may be shifted in time in comparison to the rising and/or falling edge of the oscillation signal 122 at the first frequency. As a result, the change in value of the control signal 112 may occur at random intervals.

By changing the value of the control signal 112 randomly, both the phase and frequency of the oscillation signal 122 may be random. In some known random signal generation systems, a value of a random or pseudo-random control signal may be changed at a regular interval based on a clock signal. As a result, the control signal may be phase aligned with the clock signal, resulting in the control signal having a random frequency but a non-random phase. Furthermore, merely coupling a known random signal generation system with an oscillator may result in the oscillation signal generated by the oscillator also having a non-random phase due to the oscillator phase aligning with the control signal and thus the clock signal due to injection locking of the oscillator. In contrast, by changing the value of the control signal 112 using a random or pseudo-random signal, e.g., using the oscillation signal 122, the phase of the control signal 112 and thus the phase of the oscillation signal 122 may also be random.

Modifications, additions, or omissions may be made to the system 100 without departing from the scope of the present disclosure. For example, in some embodiments, the system 100 may be a digital system, an analog system, or a mixed digital or analog system. As another example, the signal generator 110 may be a digital generator such that the control signal 112 is a digital signal or the signal generator 110 may be an analog generator such that the control signal 112 is an analog signal. In some embodiments, the oscillator 120 may be a numerically-controlled oscillator, a voltage-controlled oscillator, or a digitally-controlled oscillator.

Figure 2:
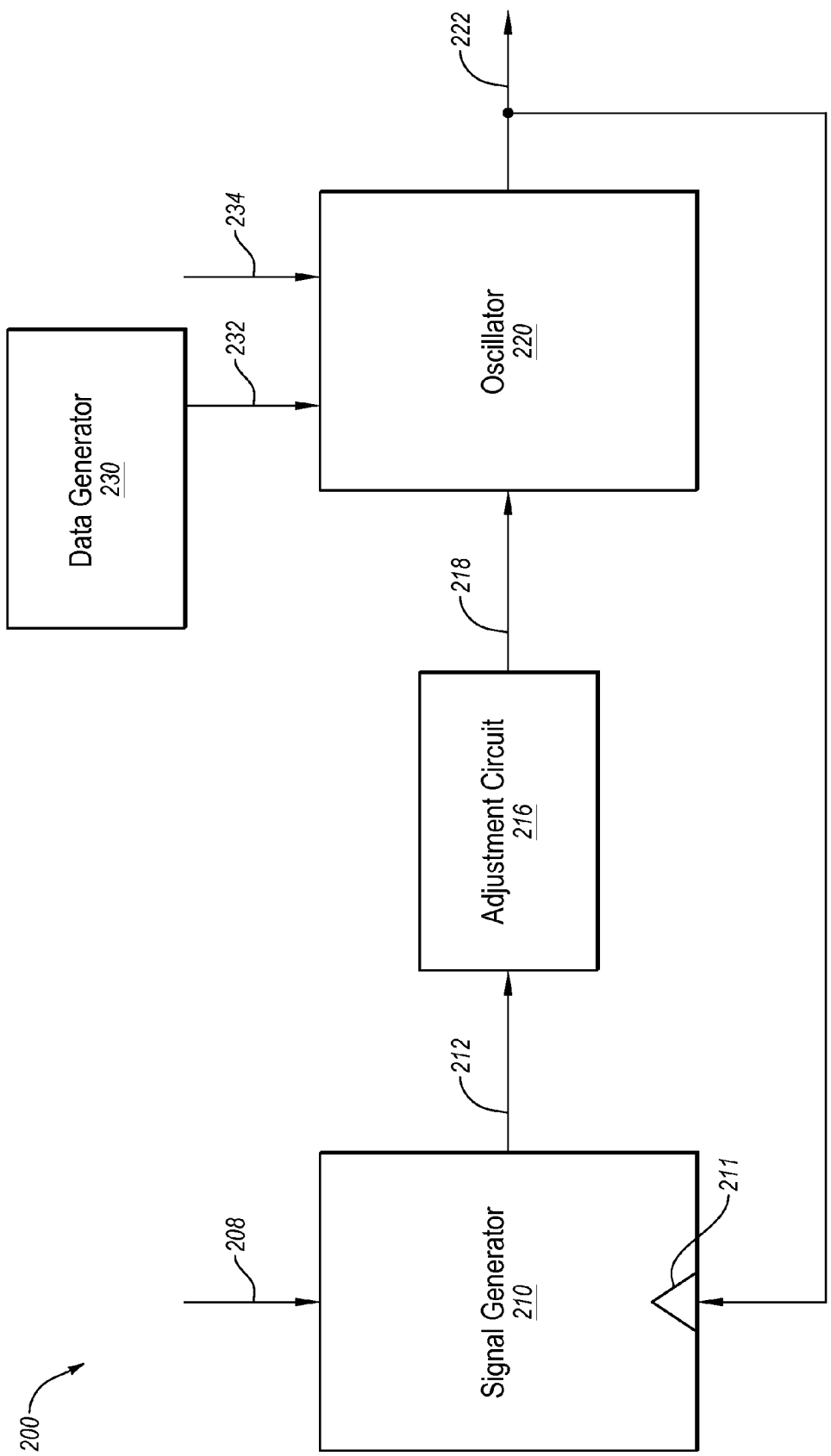
FIG. 2 is a block diagram of another example random frequency signal generating system.

FIG. 2 is a block diagram of another example random frequency signal generating system 200 ("the system 200"), arranged in accordance with at least one embodiment described herein. The system 200 may include a random or pseudo-random signal generator 210 ("signal generator 210"), an adjustment circuit 216, an oscillator 220, and a data generator 230. The signal generator 210 may be communicatively coupled to the adjustment circuit 216 and the oscillator 220. The adjustment circuit 216 may be communicatively coupled to the oscillator 220 and the signal generator 210. The data generator 230 may be communicatively coupled to the oscillator 220.

The signal generator 210 may be configured to generate a random or pseudo-random control signal 212 and to send the control signal to the adjustment circuit 216.

In some embodiments, the signal generator 210 may also be configured to receive a seeding signal 208 of one or more bits. In these and other embodiments, the signal generator 210 may be set to a seed state based on the seeding signal 208. The seed state of the signal generator 210 may be an initial state of the signal generator 210. In these and other embodiments, a current value and future values of the control signal 212 may be based on the seed state of the signal generator 210. For example, in some embodiments, based on the seed state, the signal generator 210 may generate a pseudo-random sequence of values. In these and other embodiments, a number of values in the sequence may be based on the construction of the signal generator 210 and/or the seed signal 208.

In some embodiments, the signal generator 210 may be further configured to change a value of the control signal 212 based on signals received at a clocking port 211. For example, the signal generator 210 may change a value of the control signal 212 when a rising and/or falling edge of a signal at the clocking port 211 is detected. An example of the values of the control signal 212 changing is as follows. The control signal 212 may have a first value based on a seed state of the signal generator 210. The signal generator 210 may detect a rising edge of a signal at the clocking port 211. After detecting the rising edge, the signal generator 210 may change the value of the control signal 212 to a second value.

The adjustment circuit 216 may be configured to receive the control signal 212 from the signal generator 210 and to adjust the value of the control signal 212. The adjustment circuit 216 may adjust the value of the control signal 212 to generate an adjusted control signal 218 that is more randomized than the control signal 212 from the signal generator 210. The adjustment circuit 216 may adjust the control signal 212 using any combination of signal processing or other signal adjusting mechanisms. For example, the adjustment circuit 216 may include one or more of a divider circuit, a multiplier circuit, an adder circuit, or a subtractor circuit, or some combination thereof, that applies an operand based on noise in the system 200 or some other characteristic or property of the system 200 to the control signal 212. The adjustment circuit 216 may apply the operand so that the value of the adjusted control signal 218 may not be determined based solely on the seeding signal 208 provided to the signal generator 210. Alternately or additionally, the adjustment circuit 216 may be an analog or digital circuit that adjusts the control signal 212 based on the value of the control signal 212 or some other characteristic or property of the system 200. The adjusted control signal 218 may be provided to the oscillator 220.

The oscillator 220 may receive the adjusted control signal 218 or some other signal based on the adjusted control signal 218. In some embodiments, the oscillator 220 may also receive a data signal 232 from a data generator 230 and a frequency adjust signal 234. In these and other embodiments, the oscillator 220 may be configured to generate an oscillator signal 222 based on the adjusted control signal 218, the data signal 232, and/or the frequency adjust signal 234.

The oscillator signal 222 may be output by the system 200 and may also be feedback to the signal generator 210. In particular, the oscillator signal 222 may be feedback to the clocking port 211 of the signal generator 210. As a result, the oscillator signal 222 may be used as the signal upon which the value of the control signal 212 is changed by the signal generator 210.

In some embodiments, the oscillator 220 may be configured to generate the oscillator signal 222 within multiple frequency bands. The frequency adjust signal 234 may select a frequency band for operation. For example, the oscillator 220 may include 32 frequency bands with each frequency band having a bandwidth of 100 megahertz so that the oscillator 220 has a bandwidth of 3.2 gigahertz spanning from 0 hertz to 3.2 gigahertz. A frequency adjust signal 234 with a value of 10 may select a frequency band with a bandwidth of frequencies between 1 gigahertz and 1.1 gigahertz.

The adjusted control signal 218 may be used by the oscillator 220 to select a frequency for the oscillator signal 222 within the selected frequency band. For example, assuming the frequency band has a bandwidth of frequencies between 1 gigahertz and 1.1 gigahertz, a lower value adjusted control signal 218 may result in an oscillator signal 222 that has a frequency of 1.02 gigahertz and a higher value adjusted control signal 218 may result in an oscillator signal 222 that has a frequency of 1.08 gigahertz. Note that the granularity of the control signal 212, the bandwidth of the frequency bands, and a number of frequency bands may determine a number of unique oscillator signals 222 with distinct frequencies that may be generated by the oscillator 220. As a result, the granularity of the control signal 212 may affect the entropy of the system 200. For example, when the control signal 212 is a digital control signal, the higher number of bits in the control signal 212 may increase the entropy of the system 200.

As noted above, the oscillator 220 may generate a signal based on the adjusted control signal 218 and the frequency adjust signal 234. In some embodiments, the oscillator 220 may combine the signal generated based on the adjusted control signal 218 and the frequency adjust signal 234 with the data signal 232 to generate the oscillator signal 222. The oscillator 220 may combine the signal and the data signal 232 by modulating the signal with the data signal 232. In some embodiments, modulating the signal with the data signal 232 may result in spreading the data signal 232 in the frequency domain to provide the data signal 232 with a greater bandwidth. The data signal 232 with the greater bandwidth may be output as the oscillator signal 222. Spreading the frequency of the data signal 232 may be performed for multiple reasons, including but not limited to, security by encryption, increased resistance to natural interference, increased resistance to noise and jamming, detection prevention, and limit power flux density, among others.

The data signal 232 may be generated by the data generator 230. The data generator 230 may be any digital and/or analog circuitry configured to generate the data signal 232. For example, in some embodiments, the data signal 232 may be a signal for transmission in a wireless network, such as a communication signal. In these and other embodiments, the data signal 232 may be a communication signal between a mobile device, such as a smartphone, and a cellular tower. Alternately or additionally, the data signal 232 may be a communication signal between a device and a satellite.

The system 200 may be digital, analog, or some combination thereof. For example, the signal generator 210, the adjustment circuit 216, the oscillator 220, and/or the data generator 230 may be digital, analog, or some combination therefore. Thus, in some embodiments, the control signal 212 and/or the adjusted control signal 218 may be analog signals or digital signals. When the control signal 212 and the adjusted control signal 218 are digital signals, the control signal 212 and the adjusted control signal 218 may be one or more bits. In some embodiments, when the system 200 includes a mix of analog and digital components, the system 200 may include digital-to-analog converters and/or analog-to-digital converters.

Modifications, additions, or omissions may be made to the system 200 without departing from the scope of the present disclosure. For example, in some embodiments, the system 200 may not include the adjustment circuit 216 and/or the data generator 230. Alternately or additionally, the system 200 may be configured to include a controller circuit that may be configured to provide the seeding signal 208 to the signal generator 210 and/or the frequency adjust signal 234 to the oscillator 220.

Figure 3:
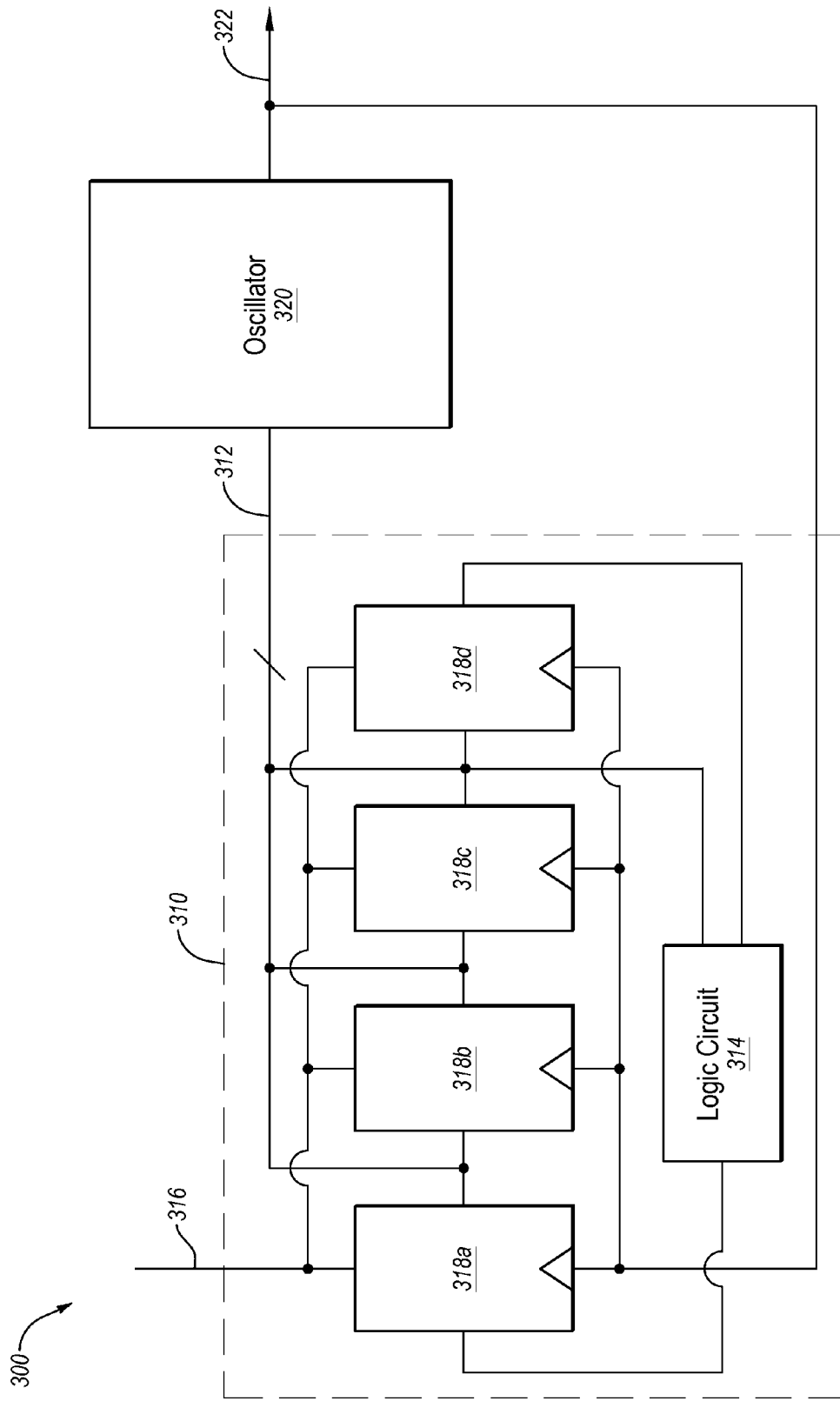
FIG. 3 is a block diagram of another example random frequency signal generating system.

FIG. 3 is a block diagram of another example random frequency signal generating system 300 ("the system 300"), arranged in accordance with at least one embodiment described herein. The system 300 may include a random or pseudo-random signal generator 310 ("signal generator 310") and an oscillator 320. The signal generator 310 may be communicatively coupled to the oscillator 320. The oscillator 320 may be analogous to the oscillators 120 and 220 of FIGS. 1 and 2, respectively. As a result, no further description of the oscillator 320 is provided with respect to FIG. 3.

The signal generator 310 may be configured to generate a random or pseudo-random control signal 312 and to send the control signal to the oscillator 320. To generate the control signal 312, the signal generator 310 may include a logic circuit 314 and first, second, third, and fourth registers 318a, 318b, 318c, and 318d, respectively, and collectively referred to herein as the registers 318. The logic circuit 314 may be a single logic gate, such as a xor, nand, and, or, nor, or some combination of logic gates or other logic circuits.

As illustrated, an output of the first register 318a is coupled to an input of the second register 318b. An output of the second register 318b is coupled to an input of the third register 318c. An output of the third register 318c is coupled to an input of the fourth register 318d and a first input of the logic circuit 314. An output of the fourth register 318d is coupled to a second input of the logic circuit 314. An output of the logic circuit 314 is coupled to an input of the first register 318a.

The outputs of the first, second, and third registers 318a, 318b, and 318c are combined to form the control signal 312 that is provided to the oscillator 320. Additionally, an oscillator signal 322 generated by the oscillator 320 based on the control signal 312 is provided to each of the registers 318, to clock the registers 318. A seeding signal 316 is also provided to each of the registers 318.

To commence operation, in some embodiments, the seeding signal 316 may provide a signal value to each of the registers 318 so that each register 318 outputs their respective signal value. The values output by the first, second, and third registers 318a, 318b, and 318c may be combined to form the three bits of the control signal 312. Additionally, the outputs of the third and fourth registers 318c and 318d may be provided to the logic circuit 314 and the logic circuit 314 may provide an input to the first register 318a based on the outputs of the third and fourth registers 318c and 318d. On a rising and/or falling edge of the oscillator signal 322, the registers 318 may bring in the values on respective inputs and reproduce the values on their respective outputs. Thus, after a rising and/or falling edge of the oscillator, the output of the logic circuit 314 may be output by the first register 318a, the second register 318b may output what the first register 318a previously output, the third register 318c may output what the second register 318b previously output, and the fourth register 318d may output what the third register 318c previously output.

An example follows where the seeding value is 1111 and the logic circuit is a xor gate. After the registers 318 are seeded, each register 318 outputs a 1, the value of the control signal 312 is 111, and the output of the logic circuit 314 is 0. After the next rising and/or falling edge of the oscillator signal 322, the first register 318a outputs 0, the second, third, and fourth registers 318b, 318c, and 318d output 1, the value of the control signal is 011, and the output of the logic circuit 314 is 0. After the next rising and/or falling edge of the oscillator signal 322, the first and second registers 318a and 318b output 0, the third and fourth registers 318c and 318d output 1, the value of the control signal is 001, and the output of the logic circuit 314 is 0. After the next rising and/or falling edge of the oscillator signal 322, the first, second, and third registers 318a, 318b, 318c output 0, the fourth register 318d outputs 1, the value of the control signal is 000, and the output of the logic circuit 314 is 1. After the next rising and/or falling edge of the oscillator signal 322, the first register 318a outputs 1, the second, third, and fourth registers 318b, 318c, and 318d output 0, the value of the control signal is 100, and the output of the logic circuit 314 is 1.

Modifications, additions, or omissions may be made to the system 300 without departing from the scope of the present disclosure. For example, in some embodiments, the signal generator 310 may include more or less than four registers. Furthermore, the control signal 312 may be based on the output of registers other than the first, second, and third registers 318a, 318b, and 318c. Alternately or additionally, the logic circuit 314 may receive inputs from more or less than two registers and the registers may be different from the third and fourth registers 318c and 318d. Alternately or additionally, one or more of the registers 318 in the signal generator 310 may not receive a value from the seeding signal 316.

Figure 4:
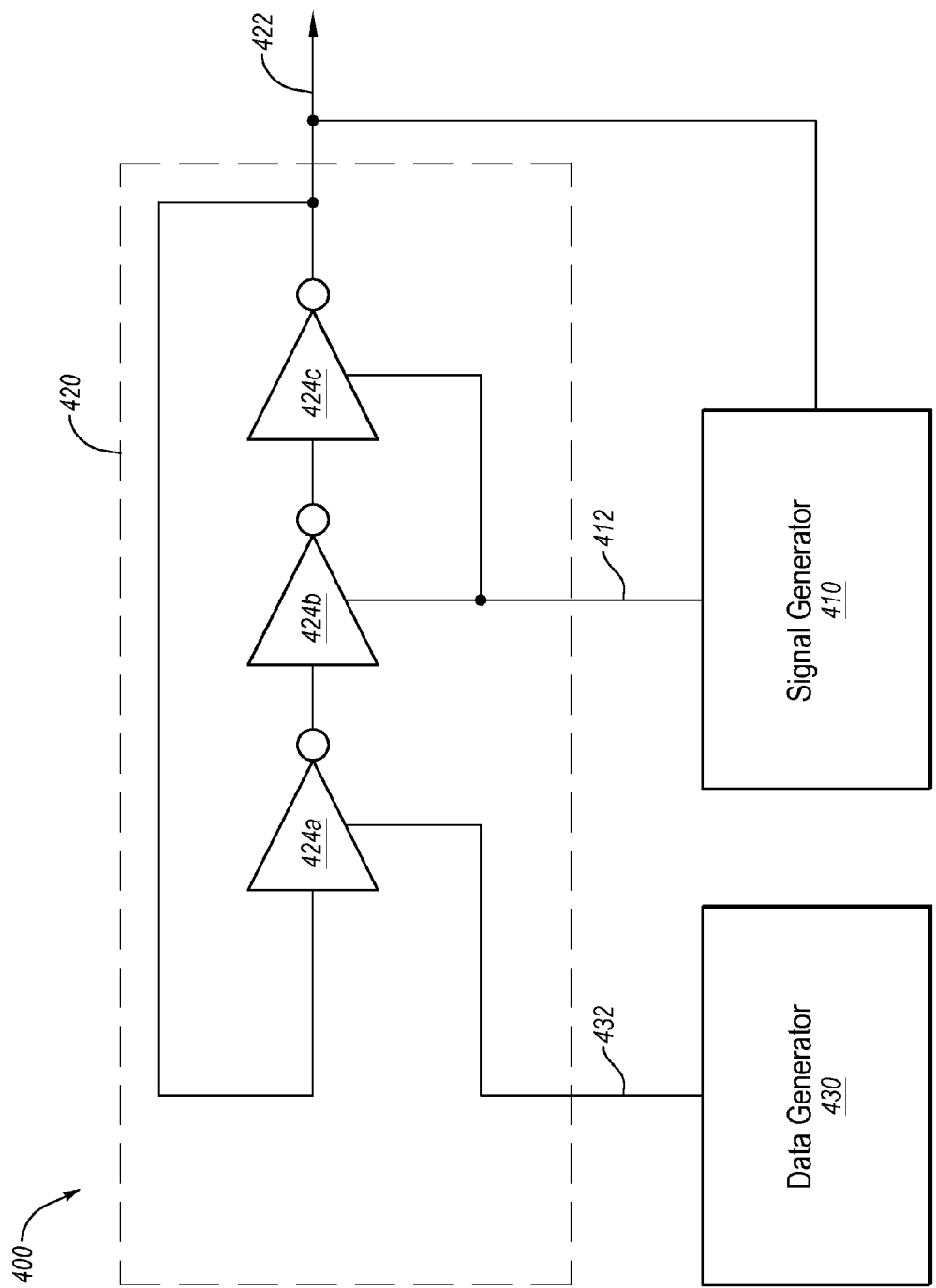
FIG. 4 is a block diagram of another example random frequency signal generating system.

FIG. 4 is a block diagram of another example random frequency signal generating system 400 ("the system 400"), arranged in accordance with at least one embodiment described herein. The system 400 may include a random or pseudo-random signal generator 410 ("signal generator 410"), an oscillator 420, and a data generator 430. The oscillator 420 may be communicatively coupled to the signal generator 410 and to the data generator 430. The signal generator 410 may be analogous to the signal generators 110, 210, and/or 310 of FIGS. 1, 2, and 3, respectively. The data generator 430 may be analogous to the data generator 230 of FIG. 2. As a result, no further description of the signal generator 410 or the data generator 430 is provided with respect to FIG. 4.

The oscillator 420 may be configured to receive a data signal 432 from the data generator 430 and a control signal 412 from the signal generator 410. Based on the data signal 432 and the control signal 412, the oscillator 420 may be configured to generate an oscillator signal 422. To generate the oscillator signal 422, the oscillator 420 may include first, second, and third amplifiers 424a, 424b, and 424c, collectively referred to herein as amplifiers 424. The amplifiers 424 may be arranged in a ring configuration. In these and other embodiments, the oscillator 420 may be a ring oscillator.

As illustrated, the first amplifier 424a is configured to receive the data signal 432 and its output is coupled to an input of the second amplifier 424b. The second amplifier 424b is configured to receive a portion of the control signal 412 and its output is coupled to an input of the third amplifier 424c. The third amplifier 424c is configured to receive another portion of the control signal 412 and its output is coupled to an input of the first amplifier 424a. The output of the third amplifier 424c may be the oscillator signal 422.

By configuring the amplifiers 424 in a feedback loop, a change in noise or other signal introduced in the loop may cause the amplifiers 424 to begin to oscillate and generate the oscillator signal 422. The amplifiers 424 may be configured to be adjusted by the data signal 432 and the control signal 412 to change the characteristics of the amplifiers 424 and thus result in a change in the oscillator signal 422. For example, the data signal 432 and the control signal 412 may adjust levels of supply voltage provided to the amplifiers 424. Adjusting the levels of the supply voltage provided to the amplifiers 424 may adjust a delay of the amplifier 424 and thus a change in the oscillator signal 422. The change in the oscillator signal 422 may include a change in a frequency and/or a phase of the oscillator signal 422. In this manner, the oscillator 420 may be configured to generate the oscillator signal 422 based on the data signal 432 and the control signal 412.

Modifications, additions, or omissions may be made to the system 400 without departing from the scope of the present disclosure. For example, in some embodiments, the oscillator 420 may include more or less than three amplifiers. Alternately or additionally, the system 400 may not include the data generator 430. Note that the oscillator 420 is an example of a type of oscillator that may be used herein. Other types of oscillators, such as inductor-capacitor oscillators, may also be used.

Figure 5:
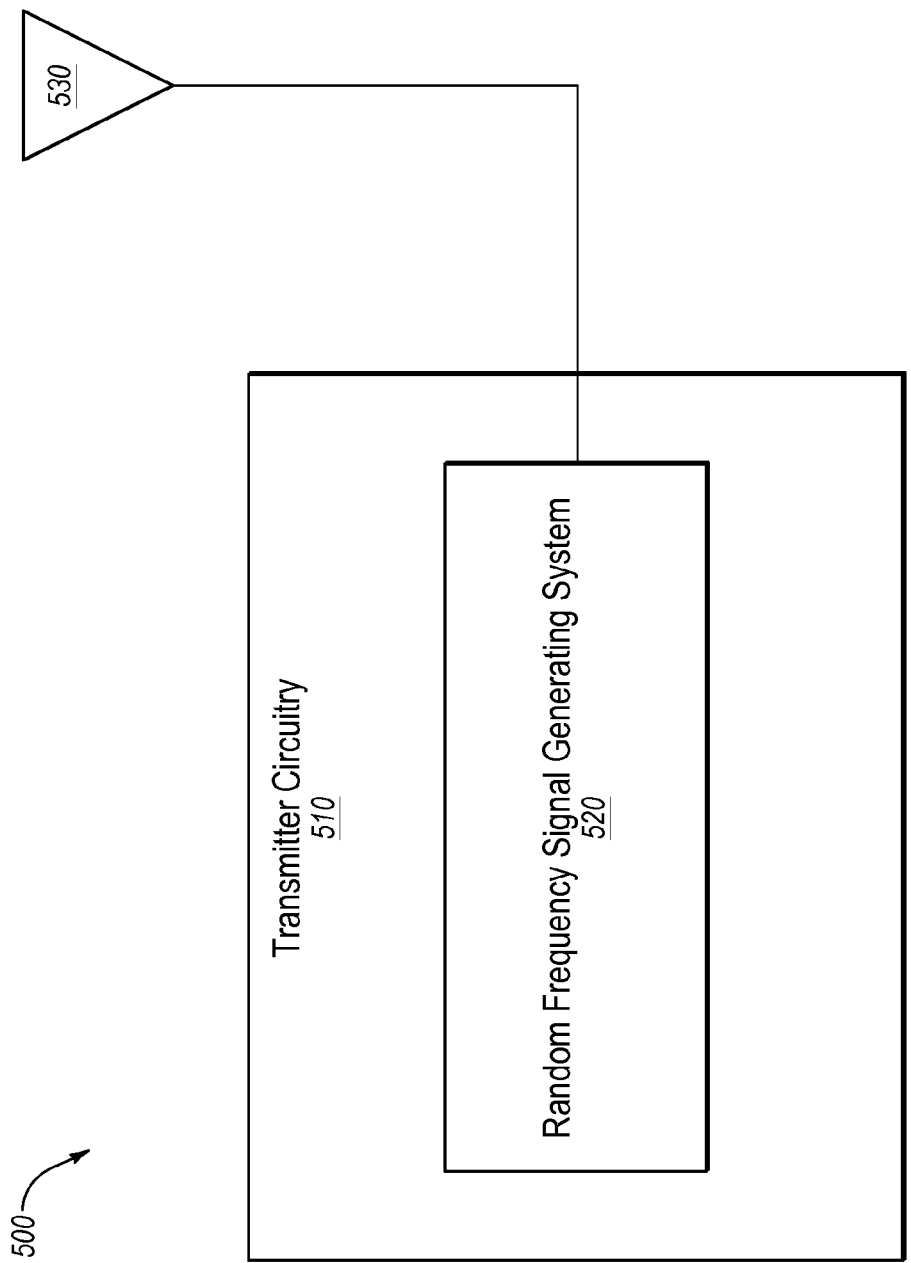
FIG. 5 is a block diagram of a portion of an example communication device that includes a random frequency signal generating system.

FIG. 5 is a block diagram of a portion of an example communication device 500 that includes a random frequency signal generating system 520, arranged in accordance with at least one embodiment described herein. The random frequency signal generating system 520 may be implemented as any of the systems 100, 200, 300, 400 of FIGS. 1-4, for instance. The communication device 500 may include a transmitter circuitry 510, the random frequency signal generating system 520, and an antenna 530. The transmitter circuitry 510 may be configured to generate data or a data signal to transmit wirelessly in the communication device 500. The transmitter circuitry 510 may send the data or data signal to the random frequency signal generating system 520.

The random frequency signal generating system 520 may be configured to spread the data or data signal received from the transmitter circuitry 510 in the frequency domain as described herein. After spreading the data or data signal in the frequency domain, the random frequency signal generating system 520 may send the spread data or data signal to the antenna 530. The antenna 530 may be configured to transmit the spread data or data signal in the wireless communication system in which the communication device 500 is a part to another communication device, such as a mobile or wireless device, a signal repeater, an access point, a satellite, or some other part of a communication system. Alternately or additionally, the random frequency signal generating system 520 may send the spread data or data signal to another component within the communication device 500 before the spread data or data signal is sent to the antenna 530.

Modifications, additions, or omissions may be made to the communication device 500 without departing from the scope of the present disclosure. For example, in some embodiments, the transmitter circuitry 510 may be a transceiver. Alternately or additionally, the communication device 500 may include multiple antennas.

Figure 6:
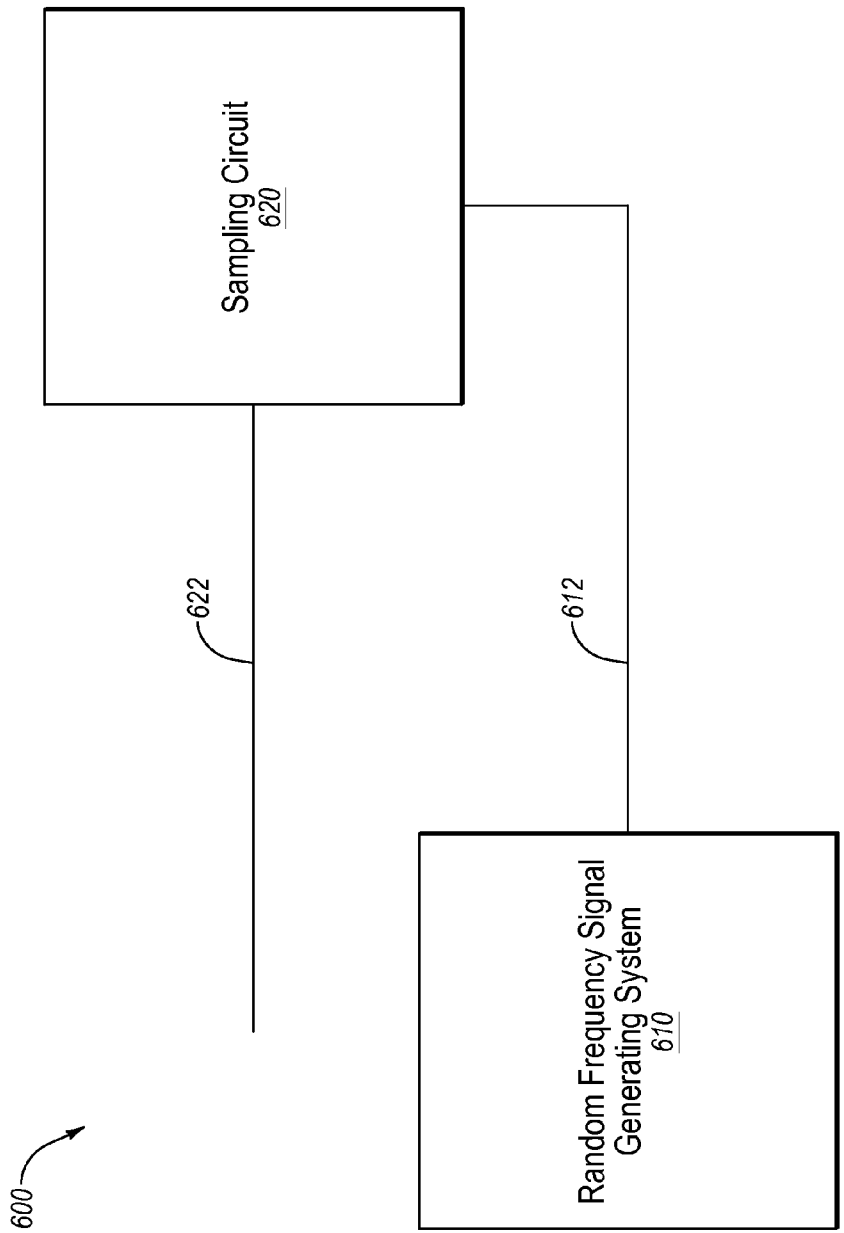
FIG. 6 is a block diagram of an example sampling system that includes a random frequency signal generating system.

FIG. 6 is a block diagram of an example sampling system 600 that includes a random frequency signal generating system 610, arranged in accordance with at least one embodiment described herein. The sampling system 600 further includes a sampling circuit 620 communicatively coupled to the random frequency signal generating system 610.

The random frequency signal generating system 610 may be analogous to the system 100, the system 200, the system 300, or the system 400 of FIGS. 1, 2, 3, and 4. The random frequency signal generating system 610 may be configured to generate a random or pseudo-random oscillator signal 612 and to send the oscillator signal 612 to the sampling circuit 620.

The sampling circuit 620 may be configured to receive the oscillator signal 612 and a signal 622. In some embodiments, the signal 622 may be a clock signal for a system that includes the sampling system 600. The sampling circuit 620 may sample the signal 622 using the oscillator signal 612. In particular, the sampling circuit 620 may sample the signal 622 at rising and/or falling edges of the oscillator signal 612. Because a phase and a frequency of the oscillator signal 612 are not related to the signal 622, the sampling circuit 620 may be able to obtain random or pseudo-random samples of a direct current ("DC") value of the signal 622. Based on the random or pseudo-random samples of a DC value of the signal 622, the sampling circuit 620 may be configured to determine a duty cycle of the signal 622 and/or when the signal 622 is skewed.

In some known sampling circuits, the known sampling circuits may sample a signal based on pseudo-random signals generated using a clock signal of a system that includes the sampling circuits. Because the pseudo-random signals in the known sampling circuits may be generated using the clock signal, a phase of the pseudo-random signals may be aligned with a phase of the clock signal. As a result, the sample of the signal may be sampled at the changing edges of the clock signal and inaccurate results may be obtained. In contrast, the random frequency signal generating system 610 may be configured to generate the oscillator signal 612 that has a phase that is not related to the phase of the signal 622, thereby resulting in better samples of the signal 622. Modifications, additions, or omissions may be made to the sampling system 600 without departing from the scope of the present disclosure.

Figure 7:
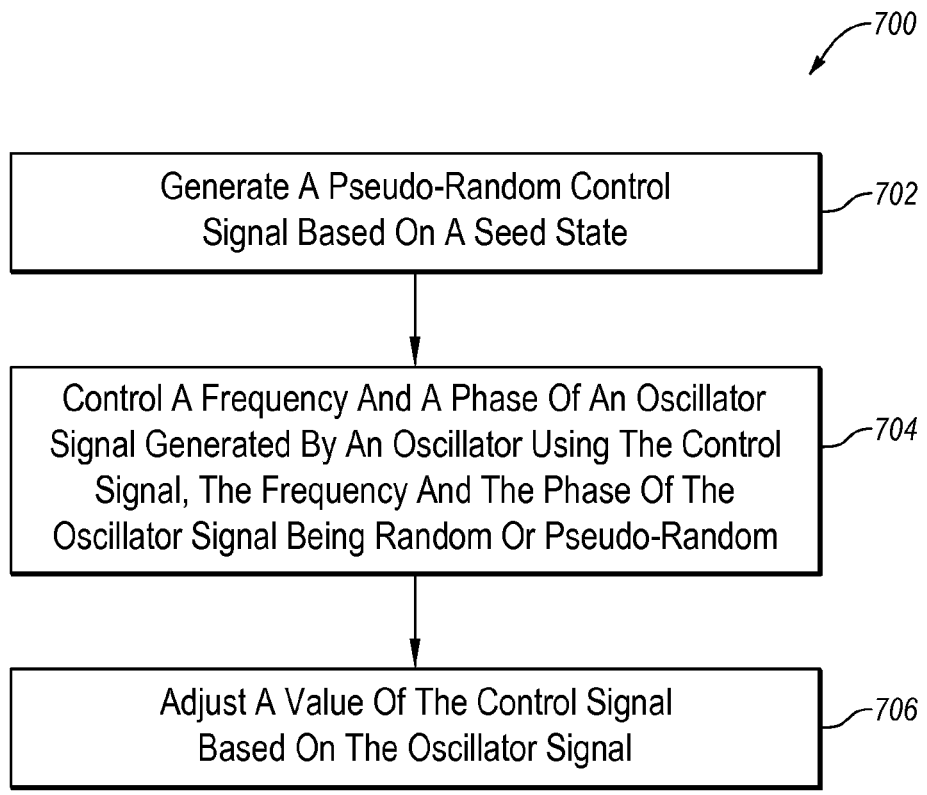
FIG. 7 is a flowchart of an example method of generating pseudo-random frequency signals.

FIG. 7 is a flowchart of an example method 700 of generating a pseudo-random frequency signal, arranged in accordance with at least one embodiment described herein. The method 700 may be implemented, in some embodiments, by a random frequency signal generating system, such as the system 100, 200, 300, or 400 of FIGS. 1, 2, 3, and 4, respectively. Although illustrated as discrete blocks, various blocks may be divided into additional blocks, combined into fewer blocks, or eliminated, depending on the desired implementation.

The method 700 may begin at block 702, where a pseudo-random control signal may be generated based on a seed state.

In block 704, a frequency and a phase of an oscillator signal generated by an oscillator may be controlled by the control signal. The frequency and the phase of the oscillator signal may be random or pseudo-random. In some embodiments, the frequency and the phase of the oscillator signal may be further controlled by a data signal received by the oscillator.

In block 706, a value of the control signal may be adjusted based on the oscillator signal. In some embodiments, adjusting the value of the control signal may include clocking multiple registers using the oscillator signal. In these and other embodiments, the pseudo-random control signal may be based on outputs of one or more of the multiple registers.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 700 may further include selecting a frequency range for the oscillator signal based on a frequency control signal received by the oscillator. Alternately or additionally, the method 700 may further include processing the output of one or more of the plurality of registers to generate the control signal provided to the oscillator.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the invention.

What is claimed is:

1. A system configured to generate a signal with a random or pseudo-random frequency, the system comprising:
   an oscillator configured to generate an oscillator signal, a frequency and a phase of the oscillator signal being random or pseudo-random and being based on a value of a received control signal;
   a signal generator configured to generate the control signal based on the oscillator signal and a seed state, the value of the control signal being random or pseudo-random; and
   an adjustment circuit configured to adjust the control signal before the control signal is received by the oscillator.

2. The system of claim 1, wherein the control signal is a digital signal or an analog signal.

3. The system of claim 1, wherein the oscillator is a numerically-controlled oscillator, a voltage-controlled oscillator, or a digitally-controlled oscillator.

4. The system of claim 1, wherein the signal generator includes a plurality of registers that are clocked using the oscillator signal.

5. The system of claim 1, wherein the oscillator is further configured to receive a data signal, the oscillator signal being based on the data signal and the control signal.

6. The system of claim 1, wherein the oscillator is further configured to receive a frequency adjust signal to select a frequency band of operation for the oscillator, wherein the value of the control signal adjusts the frequency of the oscillator signal within a selected frequency band.

7. A system configured to generate a signal with a random or pseudo-random frequency, the system comprising:
   a pseudo-random signal generator including a plurality of registers, the pseudo-random signal generator configured to generate a pseudo-random signal, a value of the pseudo-random signal being based on a seed state of the plurality of registers and changing based on an input signal; and
   an oscillator configured to receive the pseudo-random signal and a data signal and to generate a random or pseudo-random oscillator signal with a frequency and phase based on the value of the pseudo-random signal and the data signal, the oscillator signal being provided as the input signal to the pseudo-random signal generator.

8. The system of claim 7, wherein the output signal clocks the plurality of registers to cause the value of the pseudo-random signal to change.

9. The system of claim 7, wherein the pseudo-random signal comprises an output of one or more of the plurality of registers.

10. The system of claim 7, wherein the pseudo-random signal generator further includes a logic circuit configured to provide an input to one or more of the plurality of registers based on an output of one or more of the plurality of registers.

11. The system of claim 7, further comprising an adjustment circuit configured to adjust the pseudo-random signal before the pseudo-random signal is received by the oscillator.

12. The system of claim 7, wherein the oscillator is a numerically-controlled oscillator, a voltage-controlled oscillator, or a digitally-controlled oscillator.

13. The system of claim 7, wherein the oscillator is further configured to receive a frequency adjust signal to select a frequency band of operation for the oscillator, wherein the value of the pseudo-random signal adjusts the frequency of the oscillator signal within a selected frequency band.

14. A method of generating pseudo-random frequency signals, the method comprising:
   generating a pseudo-random control signal based on a seed state;
   controlling a frequency and a phase of an oscillator signal generated by an oscillator using the control signal, the frequency and the phase of the oscillator signal being random or pseudo-random;
   adjusting a value of the control signal based on the oscillator signal; and
   selecting a frequency range for the oscillator signal based on a frequency control signal received by the oscillator.

15. The method of claim 14, wherein the frequency and the phase of the oscillator signal is further controlled by a data signal received by the oscillator.

16. The method of claim 14, wherein the adjusting the value of the control signal includes clocking a plurality of registers using the oscillator signal, wherein the pseudo-random control signal is based on outputs of one or more of the plurality of registers.

17. The method of claim 16, further comprising processing the output of one or more of the plurality of registers to generate the control signal provided to the oscillator.

* * * * *